United States Patent
Shimada et al.

(10) Patent No.: US 10,384,753 B2
(45) Date of Patent: Aug. 20, 2019

(54) LAUNCHER FOR UNDERWATER VEHICLE

(71) Applicant: Kobe Steel, Ltd., Hyogo (JP)

(72) Inventors: Ryo Shimada, Takasago (JP);
Hiroyoshi Matsui, Takasago (JP);
Tomohiro Taira, Takasago (JP);
Hiroshi Hashimoto, Kobe (JP);
Shumpei Hayashi, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 16/160,467

(22) Filed: Oct. 15, 2018

(65) Prior Publication Data

US 2019/0144091 A1 May 16, 2019

(30) Foreign Application Priority Data

Nov. 13, 2017 (JP) ................. 2017-217945

(51) Int. Cl.
*B63G 8/08* (2006.01)
*H02K 41/03* (2006.01)
*B63G 8/00* (2006.01)
*H02K 11/21* (2016.01)

(52) U.S. Cl.
CPC ............... *B63G 8/08* (2013.01); *B63G 8/001* (2013.01); *H02K 11/21* (2016.01); *H02K 41/033* (2013.01); *B63G 2008/004* (2013.01)

(58) Field of Classification Search
CPC .......... B63G 8/08; B63G 8/001; H02K 11/21; H02K 41/033
See application file for complete search history.

(56) References Cited

U.S. PATENT DOCUMENTS

| | | | | |
|---|---|---|---|---|
| 2,837,971 A * | 6/1958 | Wosak | ..................... | B63G 8/32 89/5 |
| 4,971,949 A * | 11/1990 | Laskaris | ................... | F41B 6/00 114/238 |
| 5,099,745 A * | 3/1992 | Hubbell | ..................... | F41F 3/10 114/238 |
| 5,168,118 A * | 12/1992 | Schroeder | ................. | F41B 6/00 124/3 |
| 5,284,106 A * | 2/1994 | Meng | ................... | B63H 11/025 114/238 |
| 6,854,409 B1 * | 2/2005 | Galliano | .................. | B63G 8/32 114/238 |
| 10,181,779 B2 * | 1/2019 | Matsui | ..................... | F41F 3/10 |

(Continued)

*Primary Examiner* — S. Joseph Morano
*Assistant Examiner* — Jovon E Hayes
(74) *Attorney, Agent, or Firm* — Studebaker & Brackett PC

(57) ABSTRACT

The present invention is to provide a launcher for an underwater vehicle by which thrust force of a mover arranged movably in a water conducting tube can efficiently be obtained. The mover forms a plurality of magnetic circuits in which magnetic flux generated by a plurality of permanent magnets flows, and the plurality of magnetic circuits includes a first magnetic circuit in which the magnetic flux flows through one of a pair of circumferential magnets, a second magnetic circuit in which the magnetic flux flows through one of a pair of axial magnets, the second magnetic circuit being formed in parallel to the first magnetic circuit, and a third magnetic circuit in which the magnetic flux flows through a radial magnet, the third magnetic circuit being formed in parallel to the first magnetic circuit and the second magnetic circuit, respectively.

9 Claims, 13 Drawing Sheets

(56) References Cited

U.S. PATENT DOCUMENTS

| | | | | |
|---|---|---|---|---|
| 2010/0300274 A1* | 12/2010 | Root, Jr. | ............... | F41B 6/003 89/1.814 |
| 2014/0060508 A1* | 3/2014 | Floyd | ................... | F41B 6/003 124/3 |
| 2016/0372999 A1* | 12/2016 | Matsui | ................... | F41F 3/10 |
| 2019/0144091 A1* | 5/2019 | Shimada | ............... | B63G 8/08 |

* cited by examiner

F I G. 2
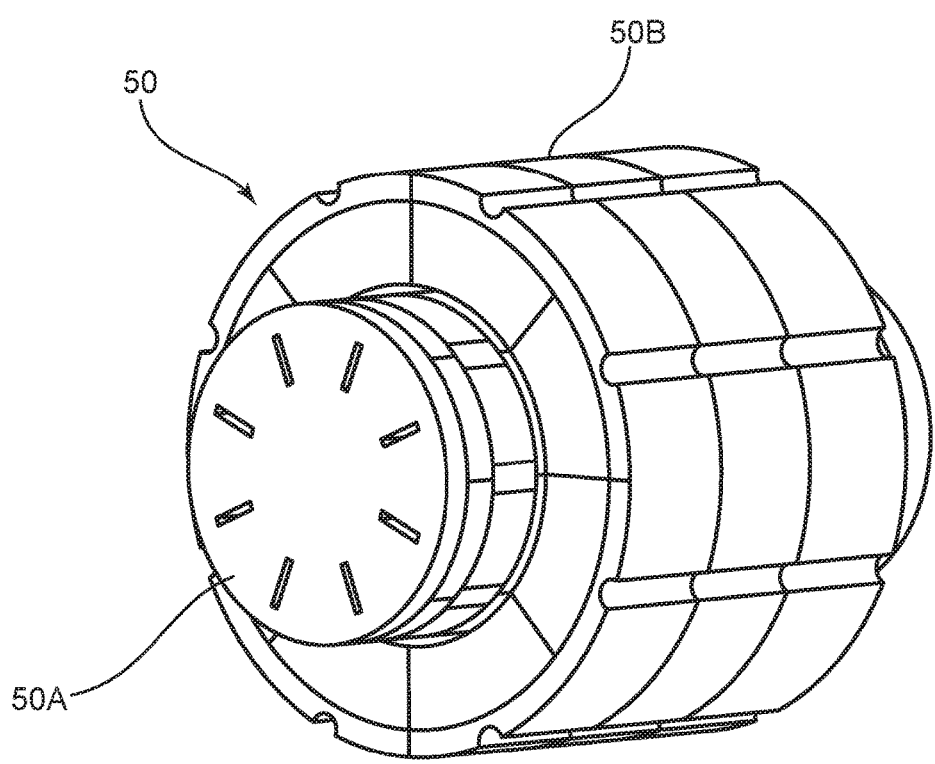

F I G. 4
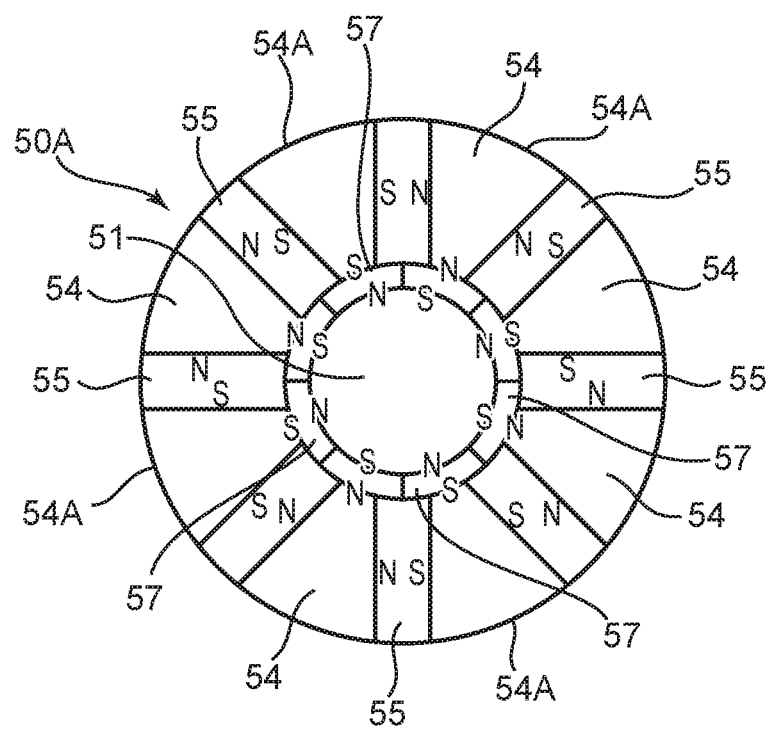

F I G. 14
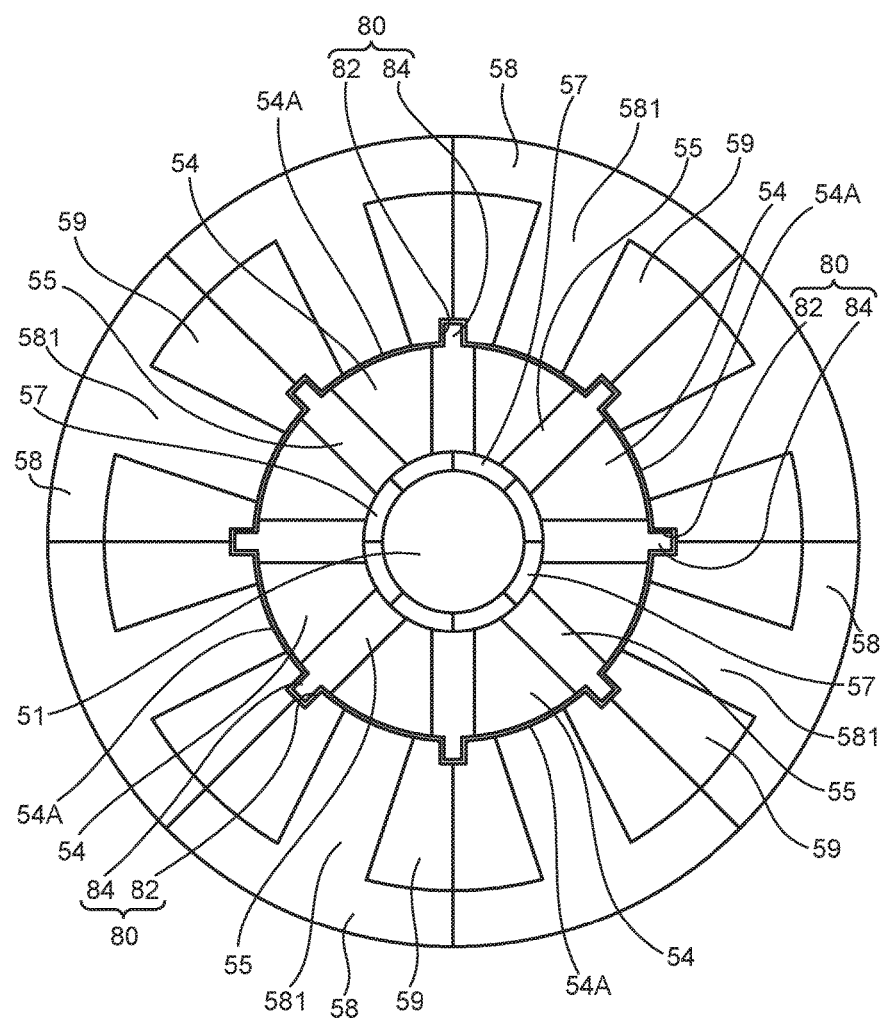

LAUNCHER FOR UNDERWATER VEHICLE

BACKGROUND OF THE INVENTION

Field of the Invention

The present invention relates to a launcher that launches an underwater vehicle by water pressure.

Description of the Related Art

There is a known launcher that launches an underwater vehicle. The launcher includes a launching tube, a water conducting tube, and a piston. The underwater vehicle is loaded on the launching tube. The water conducting tube includes a communication portion communicating with the launching tube, and water is charged inside. The piston is arranged movably in the water conducting tube. By moving the piston toward the communication portion in the water conducting tube, water pressure transmitted to the underwater vehicle in the launching tube through the communication portion is increased, and thereby, the underwater vehicle is launched.

As thrust force of the piston moved in the water conducting tube, use of not air pressure but electromagnetic force is proposed. One example of the use is disclosed in JP 2017-9278 A.

A launcher described in JP 2017-9278 A includes a plurality of water conducting coils and an induction coil for obtaining thrust force of a piston moved in a water conducting tube. The plurality of water conducting coils is arranged in a periphery of the water conducting tube and set in line in the axial direction of the water conducting tube. The induction coil is arranged in the piston. Due to power distribution to the plurality of water conducting coils, a magnetic field is generated. By a change in this magnetic field, an electric current flows through the induction coil. By electromagnetic force acting on the induction coil, the piston is moved.

However, it is revealed that with the launcher described in JP 2017-9278 A, the thrust force of the piston cannot efficiently be obtained.

An object of the present invention is to provide a launcher for an underwater vehicle by which thrust force of a mover arranged movably in a water conducting tube can efficiently be obtained.

SUMMARY OF THE INVENTION

In order to achieve the above object, the inventor of the present application focused on and examined reduction in magnetic resistance of a magnetic circuit through which magnetic flux passes. The inventor found that by adopting three magnetic circuits formed in parallel as the above magnetic circuit, the magnetic resistance of the entire magnetic circuit can be reduced and as a result, thrust force of a mover can efficiently be obtained. The present invention is completed based on such finding.

A launcher according to the present invention is a launcher that launches an underwater vehicle by water pressure, the launcher including a launching tube on which the underwater vehicle is loaded, a water conducting tube including a communication portion which communicates with the launching tube, the water conducting tube inside which water is charged, and a linear electric motor including a mover movable in the water conducting tube in the direction in which the water conducting tube extends, and a stator that moves the mover by electromagnetic force, the linear electric motor that increases water pressure transmitted to the underwater vehicle in the launching tube through the communication portion by moving the mover toward the communication portion, wherein the mover includes a yoke shaft extending in the direction in which the mover is movable, a plurality of yoke members respectively arranged in line in the circumferential direction and the axial direction of the yoke shaft so as to enclose the yoke shaft, and a plurality of permanent magnets respectively arranged in contact with the plurality of yoke members in such a manner that outside surfaces among surfaces of the plurality of yoke members, the outside surfaces being positioned on the outside in the radial direction of the yoke shaft are exposed as magnetic pole surfaces, the permanent magnets whose regions in contact with the yoke members are magnetized as the same magnetic pole, the plurality of permanent magnets includes a pair of circumferential magnets positioned on the both sides of the yoke member in the circumferential direction of the yoke shaft, each of the circumferential magnets being in contact with the yoke member, a pair of axial magnets positioned on the both sides of the yoke member in the axial direction of the yoke shaft, each of the axial magnets being in contact with the yoke member, and a radial magnet positioned on the inside of the yoke member in the radial direction of the yoke shaft, the radial magnet being in contact with the yoke member, the stator includes a plurality of iron core portions respectively arranged in line in the circumferential direction and the axial direction of the yoke shaft so as to enclose the mover, the iron core portions including teeth which are capable of opposing the magnetic pole surfaces respectively provided in the plurality of yoke members in the radial direction of the yoke shaft, and a plurality of coils wound around the teeth respectively provided in the plurality of iron core portions, with the stator, the mover forms a plurality of magnetic circuits in which magnetic flux generated by the plurality of permanent magnets flows, and the plurality of magnetic circuits includes a first magnetic circuit in which the magnetic flux flows through one of the pair of circumferential magnets, a second magnetic circuit in which the magnetic flux flows through one of the pair of axial magnets, the second magnetic circuit being formed in parallel to the first magnetic circuit, and a third magnetic circuit in which the magnetic flux flows through the radial magnet, the third magnetic circuit being formed in parallel to the first magnetic circuit and the second magnetic circuit, respectively.

With such a launcher, the first magnetic circuit, the second magnetic circuit, and the third magnetic circuit are arranged in parallel. Thus, magnetic resistance of the entire magnetic circuits can be reduced. Therefore, it is possible to increase magnetic flux density in a clearance formed between the mover and the stator. That is, it is possible to increase inter-linkable magnetic flux. As a result, thrust force of the mover can efficiently be obtained.

In the above launcher, preferably, the linear electric motor further includes a guide mechanism that regulates rotation of the mover in the circumferential direction of the yoke shaft with respect to the stator.

In this case, by regulating the rotation of the mover in the circumferential direction with respect to the stator, it is possible to stably move the mover in the direction in which the water conducting tube extends.

In the above launcher, preferably, the guide mechanism includes a guide groove formed in one of the mover and the stator, the guide groove extending in the axial direction of the yoke shaft, and a guide projection formed in the remaining one of the mover and the stator, the guide projection being positioned in the guide groove so as to be brought into contact with an inner surface of the guide groove when the mover is rotated in the circumferential direction of the yoke shaft with respect to the stator, the guide projection being movable in the guide groove in the direction in which the guide groove extends.

In this case, by bringing the guide projection into contact with the inner surface of the guide groove, it is possible to regulate the rotation of the mover in the circumferential direction with respect to the stator.

In the above launcher, preferably, the linear electric motor further includes a position detection device that detects a position of the mover in the direction in which the water conducting tube extends.

In this case, it is possible to precisely grasp the position of the mover. Therefore, for example, in a case where power distribution to the stator coil is controlled based on the position of the mover, it is possible to more properly control motion of the mover.

In the above launcher, preferably, the position detection device includes a detector arranged in the mover, and a detected member formed in the stator and arranged in a groove extending in the axial direction, the detected member extending in the direction in which the groove extends, the detected member to be detected by the detector.

In this case, the detector can be arranged close to the detected member. Thus, it is possible to more properly detect the position of the mover.

In the above launcher, preferably, the water conducting tube further includes a housing portion that allows an entry of the mover moved in the water conducting tube in such a manner that the water pressure transmitted to the underwater vehicle in the launching tube through the communication portion is increased, the housing portion having an end on the downstream side in the direction in which the mover enters, the downstream end being closed in such a manner that water charged inside the housing portion is compressed in accordance with the entry of the mover.

In this case, by the water in the housing portion pushing back the mover, the mover is decelerated. Thus, without using a mechanical means such as an engagement hook, it is possible to stop the mover. Therefore, it is possible to suppress generation of vibration and noises at the time of mechanically stopping the mover.

The above launcher preferably further includes a deceleration stator arranged in the housing portion, the deceleration stator that generates electromagnetic force acting on the plurality of permanent magnets provided in the mover which enters the housing portion, and thereby decelerates the mover.

In this case, it is possible to ease impact caused when the mover compresses the water in the housing portion.

With the launcher of the present invention, the thrust force of the mover arranged movably in the water conducting tube can efficiently be obtained.

BRIEF DESCRIPTION OF THE DRAWINGS

FIG. 2 is a perspective view showing a schematic configuration of a linear electric motor provided in the launcher shown in FIG. 1.

FIG. 4 is a cross-sectional view of the mover provided in the linear electric motor shown in FIG. 2.

FIG. 14 is a sectional view showing a linear electric motor provided in a launcher according to Application Example 1 of the embodiment of the present invention.

DESCRIPTION OF THE PREFERRED EMBODIMENTS

Hereinafter, an embodiment of the present invention will be described in detail with reference to the attached drawings.

Figure 1:
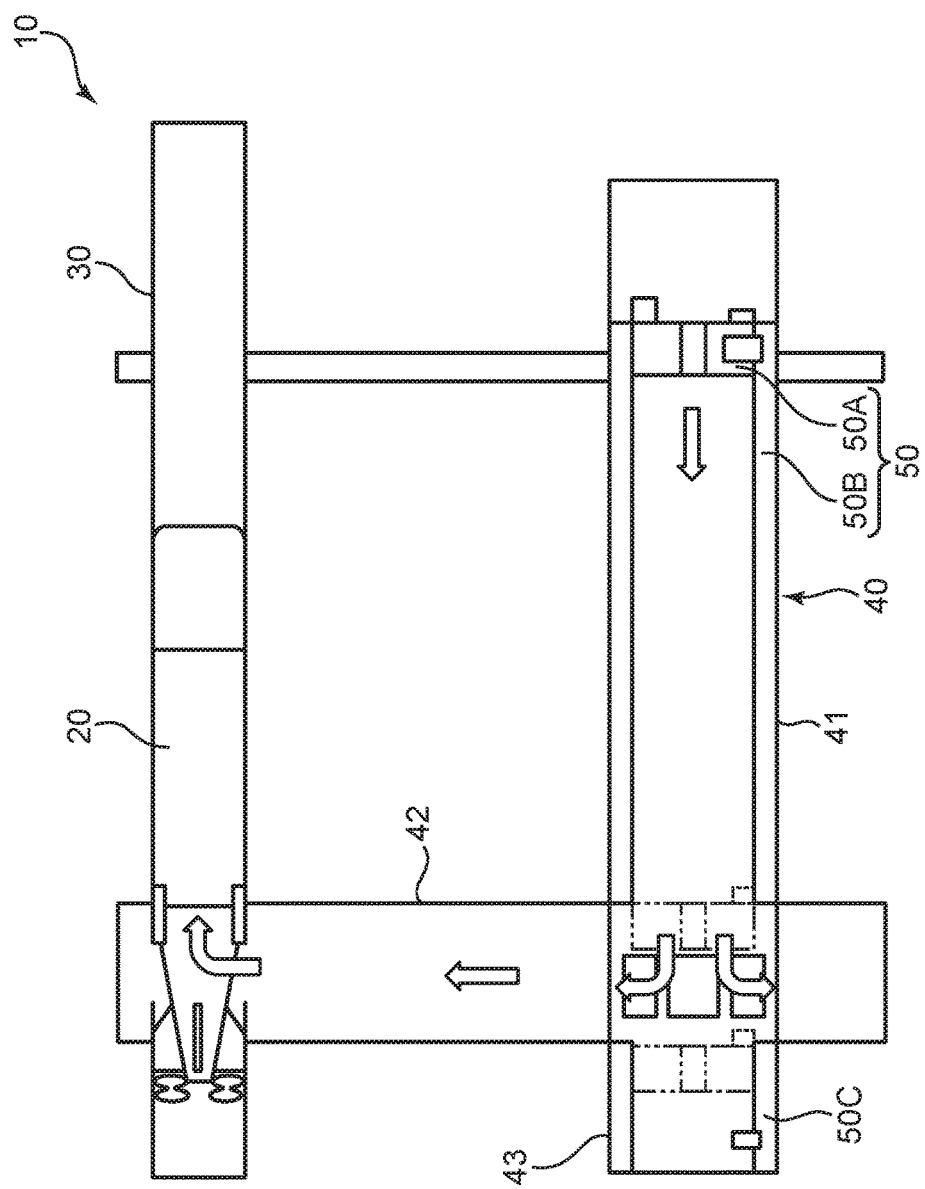
FIG. 1 is a schematic view showing a launcher according to an embodiment of the present invention.

With reference to FIG. 1, a launcher 10 serving as the embodiment of the present invention will be described. FIG. 1 is a schematic view showing the launcher 10.

The launcher 10 launches an underwater vehicle 20 by water pressure. The launcher 10 includes a launching tube 30, a water conducting tube 40, and a linear electric motor 50.

The underwater vehicle 20 is loaded on the launching tube 30.

Water (such as sea water) is charged in the water conducting tube 40. When the underwater vehicle 20 is launched, the launching tube 30 is also filled with water.

The water conducting tube 40 includes a main body tube 41 and a communication tube 42 serving as a communication portion. The communication tube 42 provides communication between the main body tube 41 and the launching tube 30. The communication tube 42 is for example a cylindrical or disk-shaped tank, and has the axial direction which matches with the axial direction of the main body tube 41, and the diameter which is greater than the diameter of the main body tube 41. The communication tube 42 may have a tubular shape extending in the radial direction of the main body tube 41.

The linear electric motor 50 increases the water pressure in the water conducting tube 40 and generates the water pressure for launching the underwater vehicle 20. The linear electric motor 50 includes a mover 50A and a stator 50B. The mover 50A is arranged in the main body tube 41 in a state where the mover is movable in the direction in which the main body tube 41 extends. The stator 50B moves the mover 50A by electromagnetic force. The stator 50B is arranged in the main body tube 41. By moving the mover 50A toward the communication tube 42 in the main body tube 41, the water pressure transmitted to the underwater vehicle 20 in the launching tube 30 through the communication tube 42 is increased. Details of the linear electric motor 50 will be described later.

In an example shown in FIG. 1, the water conducting tube 40 further includes a housing tube 43 serving as a housing portion which communicates with the main body tube 41. The housing tube 43 allows an entry of the mover 50A moved in the main body tube 41 in such a manner that the water pressure transmitted to the underwater vehicle 20 in the launching tube 30 through the communication tube 42 is increased. The housing tube 43 is positioned on the downstream side of the communication tube 42 in the moving direction of the mover 50A when the water pressure transmitted to the underwater vehicle 20 in the launching tube 30 through the communication tube 42 is increased. An end of the housing tube 43 on the downstream side in the direction in which the mover 50A enters is closed in such a manner that the water charged inside the housing tube is compressed in accordance with the entry of the mover 50A. By the water in the housing tube 43 pushing back the mover 50A, the mover 50A is decelerated. Thus, without using a mechanical means such as an engagement hook, it is possible to stop the mover 50A. As a result, it is possible to suppress generation of vibration and noises at the time of mechanically stopping the mover 50A.

In the example shown in FIG. 1, the launcher 10 further includes a deceleration stator 50C. The deceleration stator 50C is arranged in the housing tube 43. The deceleration stator 50C decelerates the mover 50A entering the housing tube 43 by electromagnetic force. Therefore, it is possible to ease impact caused when the mover 50A compresses the water in the housing tube 43.

With reference to FIG. 2, the linear electric motor 50 will be described. FIG. 2 is a perspective view showing a schematic configuration of the linear electric motor 50. In the following description, the axial direction, the radial direction, and the circumferential direction will be the axial direction, the radial direction, and the circumferential direction of the mover 50A.

The mover 50A is formed in a cylindrical shape. The stator 50B is formed in a tubular shape so as to enclose the mover 50A. In FIG. 2, the axial length of the mover 50A is greater than the axial length of the stator 50B. However, in reality, as shown in FIG. 1, the axial length of the stator 50B is sufficiently greater than the axial length of the mover 50A.

Figure 3:
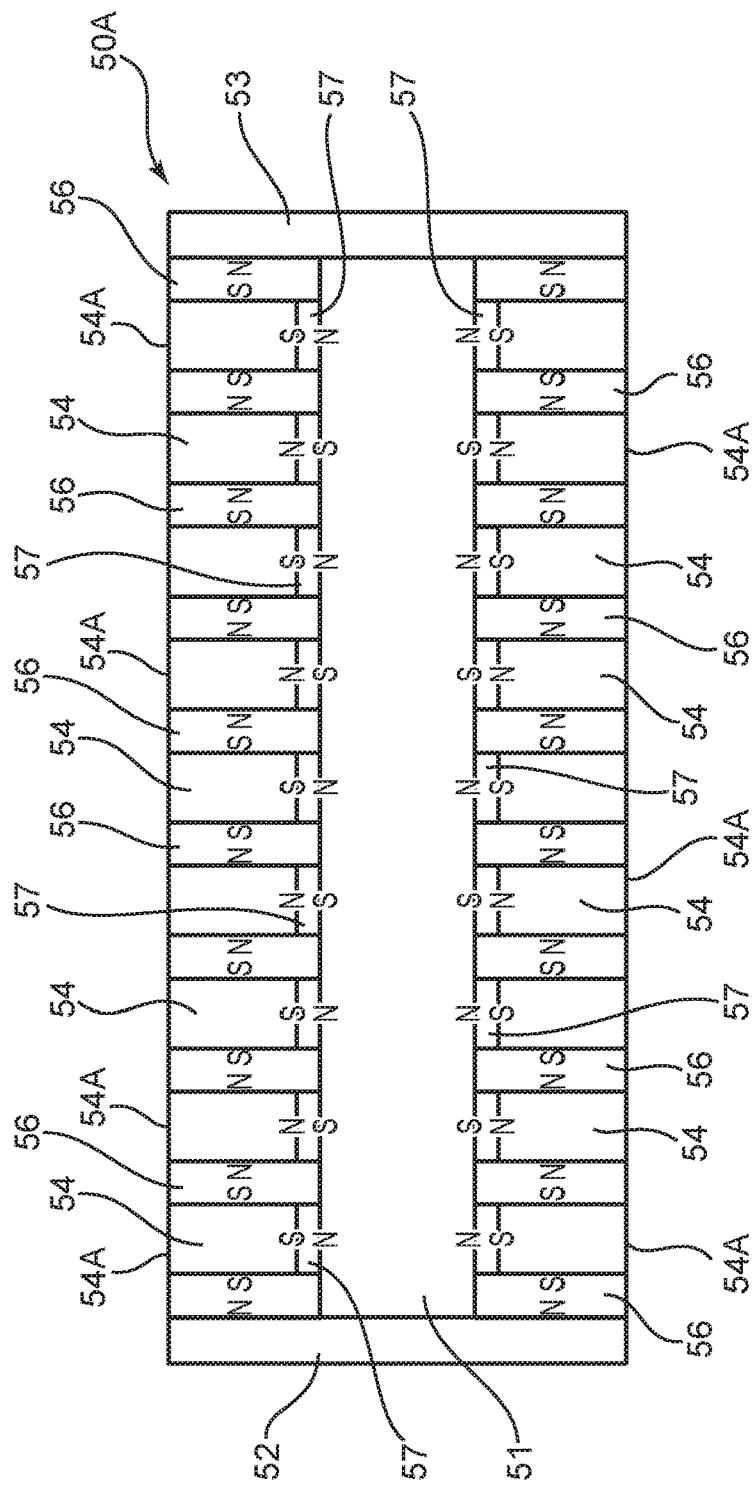
FIG. 3 is a vertically-sectional view of a mover provided in the linear electric motor shown in FIG. 2.

With reference to FIGS. 3 and 4, the mover 50A will be described. FIG. 3 is a vertically-sectional view of the mover 50A. FIG. 4 is a cross-sectional view of the mover 50A.

The mover 50A includes a yoke shaft 51, a first end plate 52, a second end plate 53, a plurality of yoke members 54, and a plurality of permanent magnets 55, 56, 57. Hereinafter, these elements will be described.

The yoke shaft 51 has a cylindrical shape extending in the direction in which the mover 50A is movable. A material of the yoke shaft 51 is a dust core.

The first end plate 52 is fixed to one axial end of the yoke shaft 51. The second end plate 53 is fixed to the other axial end of the yoke shaft 51. Both the first end plate 52 and the second end plate 53 have a disk shape, and the diameter which is greater than the diameter of the yoke shaft 51.

The plurality of yoke members 54 is arranged so as to enclose the yoke shaft 51. The plurality of yoke members 54 is set in line in the circumferential direction and the axial direction of the yoke shaft 51. The plurality of yoke members 54 is respectively made of a dust core.

The plurality of permanent magnets 55, 56, 57 is respectively arranged in contact with the plurality of yoke members 54 in such a manner that outside surfaces among surfaces of the plurality of yoke members 54, the outside surfaces being positioned on the outside in the radial direction of the yoke shaft 51 are exposed as magnetic pole surfaces 54A. Regions of the plurality of permanent magnets 55, 56, 57 in contact with the yoke members 54 are magnetized as the same magnetic pole.

The regions of the permanent magnets 55, 56, 57 in contact with one of the two circumferentially-adjacent yoke members 54 are magnetized as a magnetic pole different from the regions of the permanent magnets 55, 56, 57 in contact with the other yoke member 54. Therefore, the magnetic pole surface 54A provided in one of the two circumferentially-adjacent yoke members 54 is magnetized as a magnetic pole different from the magnetic pole surface 54A provided in the other yoke member.

The regions of the permanent magnets 55, 56, 57 in contact with one of the two axially-adjacent yoke members 54 are magnetized as a magnetic pole different from the regions of the permanent magnets 55, 56, 57 in contact with the other yoke member 54. Therefore, the magnetic pole surface 54A provided in one of the two axially-adjacent yoke members 54 is magnetized as a magnetic pole different from the magnetic pole surface 54A provided in the other yoke member.

The plurality of permanent magnets 55, 56, 57 includes a pair of circumferential magnets 55, a pair of axial magnets 56, and a radial magnet 57.

The pair of circumferential magnets 55 is positioned on the both sides of the yoke member 54 in the circumferential direction. Each of the pair of circumferential magnets 55 is in contact with the yoke member 54.

The pair of axial magnets 56 is positioned on the both sides of the yoke member 54 in the axial direction. Each of the pair of axial magnets 56 is in contact with the yoke member 54.

The radial magnet 57 is positioned on the inside of the yoke member 54 in the radial direction. The radial magnet 57 is in contact with the yoke member 54.

Figure 5:
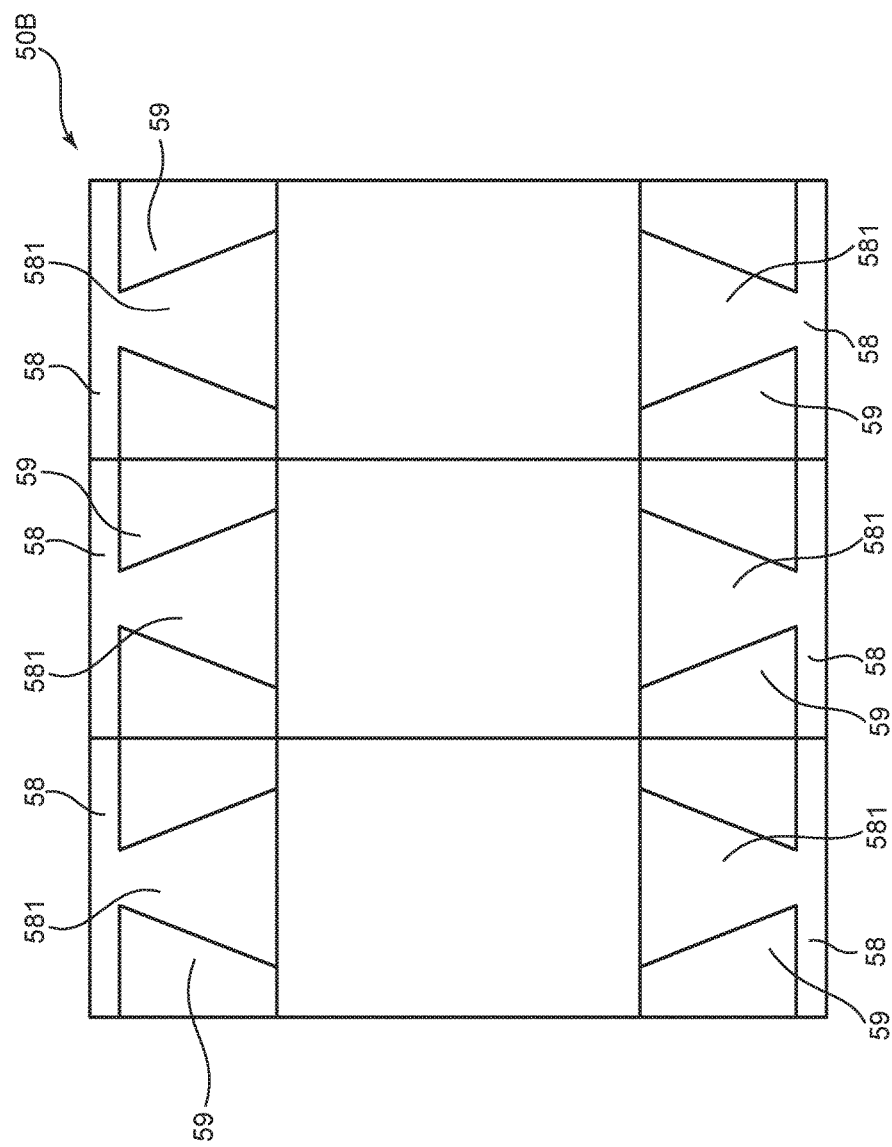
FIG. 5 is a vertically-sectional view of a stator provided in the linear electric motor shown in FIG. 2.
Figure 6:
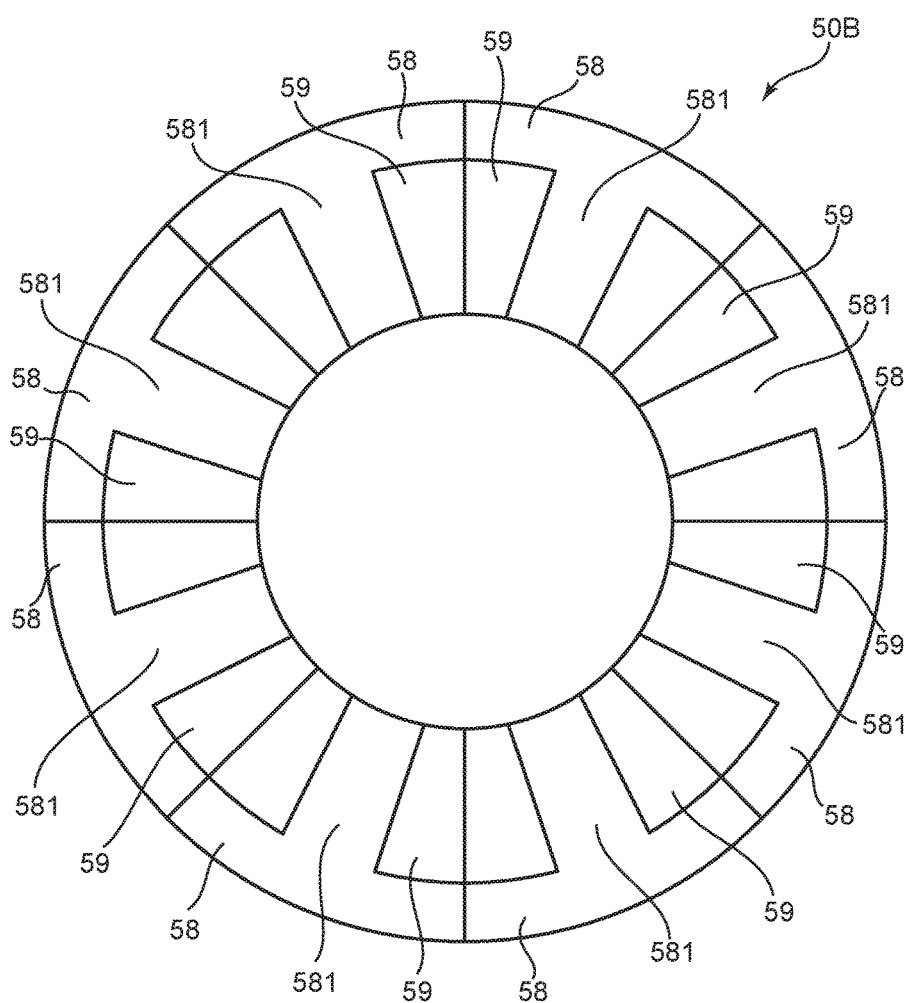
FIG. 6 is a cross-sectional view of the stator provided in the linear electric motor shown in FIG. 2.

With reference to FIGS. 5 and 6, the stator 50B will be described. FIG. 5 is a vertically-sectional view of the stator 50B. FIG. 6 is a cross-sectional view of the stator 50B.

The stator 50B includes a plurality of iron core portions 58, and a plurality of coils 59.

The plurality of iron core portions 58 is respectively arranged in line in the circumferential direction and the axial direction so as to enclose the mover 50A. Each of the plurality of the iron core portions 58 includes a tooth 581. The teeth 581 are placed at positions where the teeth are capable of opposing the magnetic pole surfaces 54A respectively provided in the plurality of yoke members 54 in the radial direction.

The plurality of coils 59 is wound around the teeth 581 respectively provided in the plurality of iron core portions 58.

By respectively controlling power distribution to the plurality of coils 59, magnetic poles generated on end surfaces of the teeth 581 around which the coils 59 are wound are changed. Specifically, the magnetic pole generated on the end surface of one of the two circumferentially-adjacent teeth 581 is different from the magnetic pole generated on the end surface of the other tooth. The magnetic pole generated on the end surface of one of the two axially-adjacent teeth 581 is different from the magnetic pole generated on the end surface of the other tooth.

In such a way, by changing the magnetic poles generated on the end surfaces of the teeth 581 of the stator 50B, attraction or repulsion by magnetic force is generated between the magnetic poles of the magnetic pole surfaces 54A of the mover 50A and the above magnetic poles. Thereby, the mover 50A is moved in the axial direction.

Respective power distribution to the plurality of coils 59 is controlled by, for example, a position of the mover 50A (axial position of the main body tube 41). The position of the mover 50A is detected, for example, by using an ultrasonic sensor serving as a position detection device.

With the stator 50B, the mover 50A forms a plurality of magnetic circuits through which the magnetic flux generated by the plurality of permanent magnets 55, 56, 57 passes.

Figure 7:
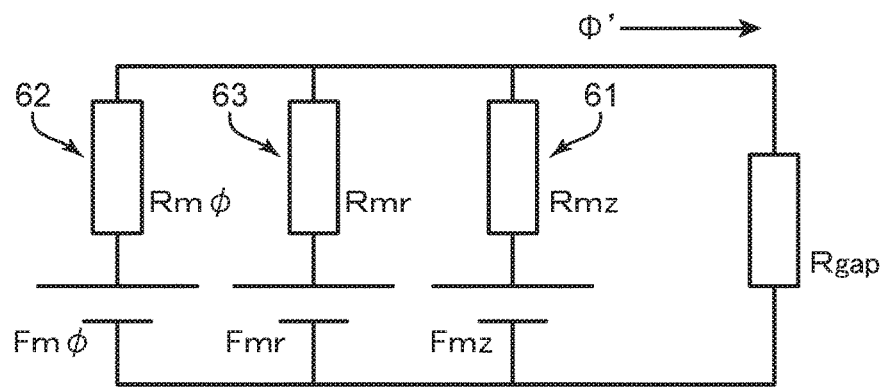
FIG. 7 is a circuit diagram showing the entire magnetic circuit of the linear electric motor shown in FIG. 2.
Figure 8:
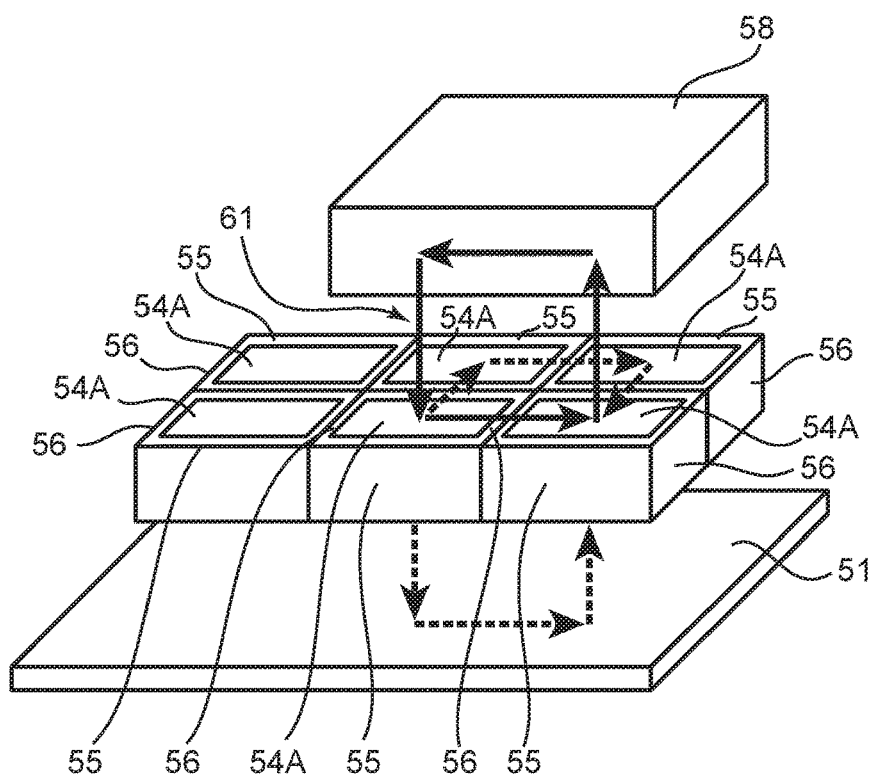
FIG. 8 is a model diagram showing the direction in which magnetic flux flows in a first magnetic circuit of the linear electric motor shown in FIG. 2.
Figure 9:
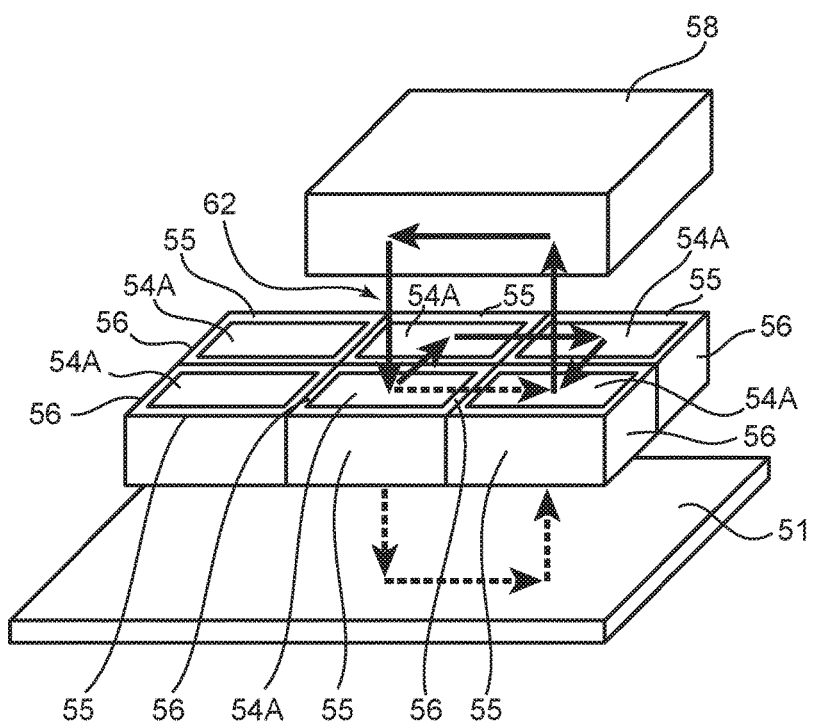
FIG. 9 is a model diagram showing the direction in which the magnetic flux flows in a second magnetic circuit of the linear electric motor shown in FIG. 2.
Figure 10:
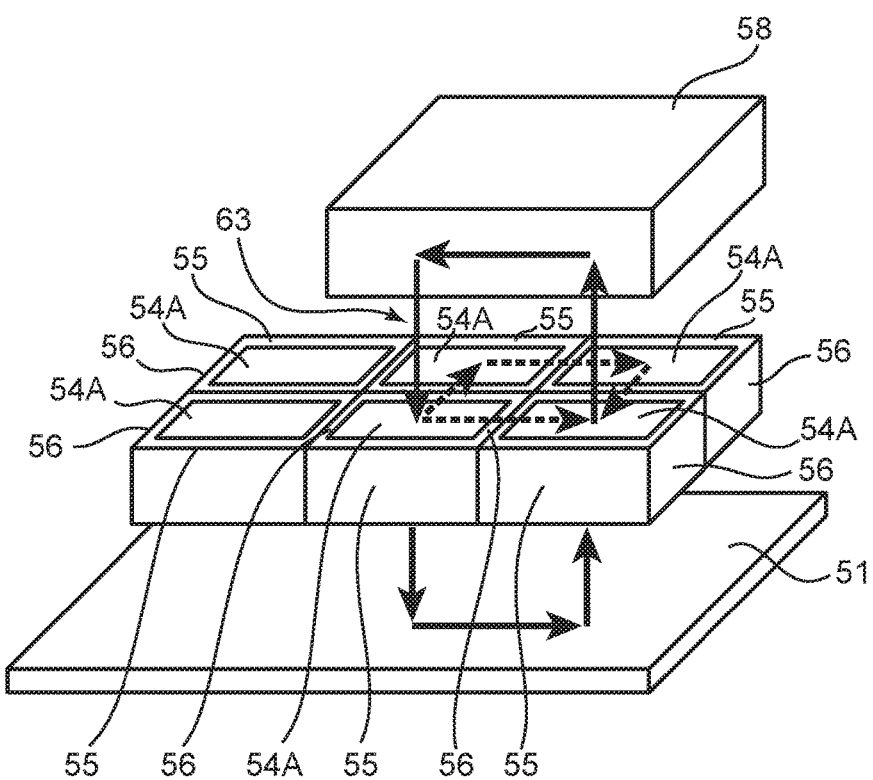
FIG. 10 is a model diagram showing the direction in which the magnetic flux flows in a third magnetic circuit of the linear electric motor shown in FIG. 2.

With reference to FIGS. 7, 8, 9, and 10, a plurality of magnetic circuits 61, 62, 63 formed by the mover 50A with the stator 50B will be described. FIG. 7 is a circuit diagram showing the entire magnetic circuit of the linear electric motor 50. FIG. 8 is a model diagram showing the direction in which the magnetic flux flows in the magnetic circuit 61. FIG. 9 is a model diagram showing the direction in which the magnetic flux flows in the magnetic circuit 62. FIG. 10 is a model diagram showing the direction in which the magnetic flux flows in the magnetic circuit 63.

In FIGS. 8, 9, and 10, arrangement of the plurality of yoke members 54 and the plurality of permanent magnets 55, 56, 57 in contact with the yoke members 54 is developed on the plane. FIGS. 8, 9, and 10 show a case where two magnets are arranged between the two adjacent yoke members 54. However, these two magnets can be regarded as one magnet at the end. Although not shown, in FIGS. 8, 9, and 10, one magnet is arranged between the yoke member 54 and the yoke shaft 51.

The plurality of magnetic circuits 61, 62, 63 includes the magnetic circuit 61, the magnetic circuit 62, and the magnetic circuit 63.

As shown in FIG. 7, the magnetic circuit 61, the magnetic circuit 62, and the magnetic circuit 63 are formed in parallel. In FIG. 7, Φ denotes magnetic flux, $F_{m\varphi}$ and $R_{m\varphi}$ respectively denote magnetomotive force and magnetic resistance of magnets in the second magnetic circuit 62, $F_{mr}$ and $R_{mr}$ respectively denote magnetomotive force and magnetic resistance of magnets in the third magnetic circuit 63, $F_{mz}$ and $R_{mz}$ respectively denote magnetomotive force and magnetic resistance of magnets in the first magnetic circuit 61, and $R_{gap}$ denotes magnetic resistance of a clearance.

As shown in FIG. 8, the magnetic circuit 61 is a route in which magnetic flux coming out of a tooth 581 provided in an iron core portion 58 of the stator 50B enters a yoke member 54 (yoke member 541), and returns to a tooth 581 provided in another iron core portion 58 of the stator 50B from a yoke member 54 (yoke member 542) positioned adjacently to the yoke member 541 in the axial direction. The magnetic flux flowing from the yoke member 541 to the yoke member 542 passes through the permanent magnet (axial magnet 56) positioned between the yoke member 541 and the yoke member 542.

As shown in FIG. 9, the magnetic circuit 62 is a route in which magnetic flux coming out of a tooth 581 provided in an iron core portion 58 of the stator 50B enters a yoke member 54 (yoke member 541), and returns to a tooth 581 provided in another iron core portion 58 of the stator 50B from a yoke member 54 (yoke member 542) positioned adjacently to the yoke member 541 in the axial direction. The magnetic flux flowing from the yoke member 541 to the yoke member 542 goes through a yoke member 54 (yoke member 543) positioned adjacently to the yoke member 541 in the circumferential direction, and a yoke member 54 (yoke member 544) positioned adjacently to the yoke member 543 in the axial direction. The magnetic flux flowing from the yoke member 541 to the yoke member 543 passes through a permanent magnet (circumferential magnet 55) positioned between the yoke member 541 and the yoke member 543. The magnetic flux flowing from the yoke member 543 to the yoke member 544 passes through a permanent magnet (axial magnet 56) positioned between the yoke member 543 and the yoke member 544. The magnetic flux flowing from the yoke member 544 to the yoke member 542 passes through a permanent magnet (circumferential magnet 55) positioned between the yoke member 544 and the yoke member 542.

As shown in FIG. 10, the magnetic circuit 63 is a route in which magnetic flux coming out of a tooth 581 provided in an iron core portion 58 of the stator 50B enters a yoke member 54 (yoke member 541), and returns to a tooth 581 provided in another iron core portion 58 of the stator 50B from a yoke member 54 (yoke member 542) positioned adjacently to the yoke member 541 in the axial direction. The magnetic flux flowing from the yoke member 541 to the yoke member 542 goes through the yoke shaft 51. The magnetic flux flowing from the yoke member 541 to the yoke shaft 51 passes through a permanent magnet (radial magnet 57) positioned between the yoke member 541 and the yoke shaft 51. The magnetic flux flowing from the yoke shaft 51 to the yoke member 542 passes through a permanent magnet (radial magnet 57) positioned between the yoke shaft 51 and the yoke member 542.

FIGS. 8, 9, and 10 show the two axially-adjacent iron core portions 58 as a single member for the sake of convenience. However, the iron core portion 58 having the tooth 581 of which the magnetic flux comes out is different from the iron core portion 58 having the tooth 581 to which the magnetic flux enters. In addition, FIGS. 8, 9, and 10 show a case where the magnetic pole surface 54A to which the magnetic flux enters and the magnetic pole surface 54A of which the magnetic flux comes out are set in line in the axial direction. However, the magnetic pole surface 54A to which the magnetic flux enters and the magnetic pole surface 54A of which the magnetic flux comes out may be set in line in the circumferential direction.

As described above, in the magnetic circuit 61, the magnetic circuit 62, and the magnetic circuit 63, the magnetic pole surface 54A to which the magnetic flux enters is the same, and the magnetic pole surface 54A of which the magnetic flux comes out is also the same. Therefore, the magnetic circuit 61, the magnetic circuit 62, and the magnetic circuit 63 are formed in parallel.

Since the magnetic circuit 61, the magnetic circuit 62, and the magnetic circuit 63 are formed in parallel in such a way, it is possible to reduce magnetic resistance in the entire magnetic circuit of the linear electric motor 50. Hereinafter, the reason for this will be described.

In the first magnetic circuit 61, the second magnetic circuit 62, and the third magnetic circuit 63, by the Ampere's circuital law, the following equations are established.

First magnetic circuit: $2gH_g + l_z H_z = 0$  (1)

Second magnetic circuit: $2gH_g + 2l_\varphi H_\varphi - l_z H_z = 0$  (2)

Third magnetic circuit: $2gH_g + 2l_{ra} H_{ra} = 0$  (3)

In the above equations, g denotes clearance length, $H_g$ denotes strength of a magnetic field in the clearance, $l_z$ denotes thickness of the axial magnet 56, $H_z$ denotes strength of a magnetic field in the axial magnet 56, $l_\varphi$ denotes thickness of the circumferential magnet 55, $H_\varphi$ denotes strength of a magnetic field in the circumferential magnet 55, $l_{ra}$ denotes thickness of the radial magnet 57, and $H_{ra}$ denotes strength of a magnetic field in the radial magnet 57.

If saturation magnetic flux density $B_r$ is the same, the following equations are established in the first magnetic circuit 61, the second magnetic circuit 62, and the third magnetic circuit 63.

First magnetic circuit: $B_z = \mu 0 H_z + B_r$ (4)

Second magnetic circuit: $B_\varphi = \mu 0 H_\varphi + B_r$ (5)

Third magnetic circuit: $B_{ra} = \mu 0 H_{ra} + B_r$ (6)

In the above equations, $B_z$ denotes magnetic flux density in the axial magnet 56, $B_\varphi$ denotes magnetic flux density in the circumferential magnet 55, and $B_{ra}$ denotes magnetic flux density in the radial magnet 57.

Since the magnetic flux flowing into the yoke member 542 and the magnetic flux flowing out of the yoke member 542 are maintained (divB=0), the following equation is established.

$$B_{ra}A_{ra} + B_\varphi A_\varphi + B_z A_z = B_{gap} A_f \quad (7)$$

In the above equation, $A_f$ denotes a surface area of the magnetic pole surface 54A in the yoke member 54, $A_{ra}$ denotes a surface area of a part of the radial magnet 57, the part being in contact with the yoke member 54, $A_\varphi$ denotes a surface area of a part of the circumferential magnet 55, the part being in contact with the yoke member 54, and $A_z$ denotes a surface area of a part of the axial magnet 56, the part being in contact with the yoke member 54.

When the above equations (1), (2), and (3) are transformed and organized, the following equations are obtained.

$H_z = -(2g/l_z) H_{gap}$ (8)

$H_\varphi = -(2g/l_\varphi) H_{gap}$ (9)

$H_{ra} = -(2g/l_{ra}) H_{gap}$ (10)

When the above equation (7) is organized by using the above equations (4), (5), (6), (8), (9), and (10), the following equation is obtained.

$$B_{gap} = B_r \frac{A_{ra} + A_\varphi + A_z}{A_f + g\left(\dfrac{A_{ra}}{l_{ra}} + 2\dfrac{A_\varphi}{l_\varphi} + 2\dfrac{A_z}{l_z}\right)} \quad (11)$$

When $A_f$, $A_\varphi$, and $A_z$ are 400 [mm²], Ar is 625 [mm²], $l_\varphi$ and $l_z$ are 6 [mm], $l_r$ is 4 [mm], $B_r$ is 1.33 to 1.25 [T], and g/2 is 1.00±0.04 [mm], from the above equation (11), $B_{gap}$ is equal to 1.59 to 1.76 [T].

Figure 11:
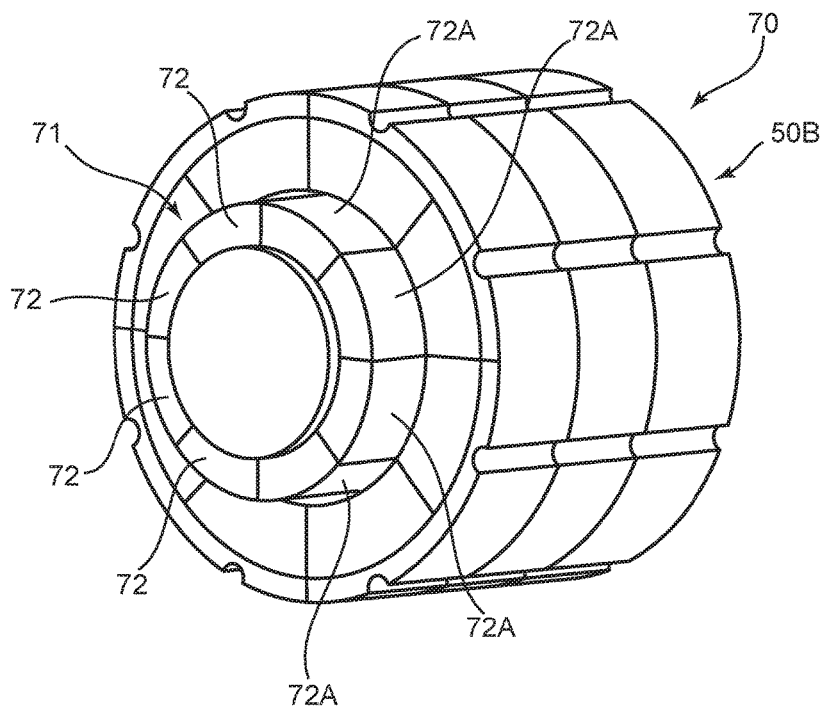
FIG. 11 is a perspective view showing a linear electric motor according to a comparative example.

Meanwhile, as shown in FIG. 11, a linear electric motor 70 according to a comparative example has a mover 71 different from the linear electric motor 50. In the mover 71 of the linear electric motor 70 according to the comparative example, a plurality of permanent magnets 72 is arranged in line in the axial direction and the circumferential direction in comparison with the mover 50A of the linear electric motor 50. Magnetic pole surfaces 72A of two axially-adjacent permanent magnets 72, the magnetic pole surfaces opposing the teeth 581 of the stator 50B, have magnetic poles different from each other. Magnetic pole surfaces 72A of two circumferentially-adjacent permanent magnets 72, the magnetic pole surfaces opposing the teeth 581 of the stator 50B, have magnetic poles different from each other.

Figure 12:
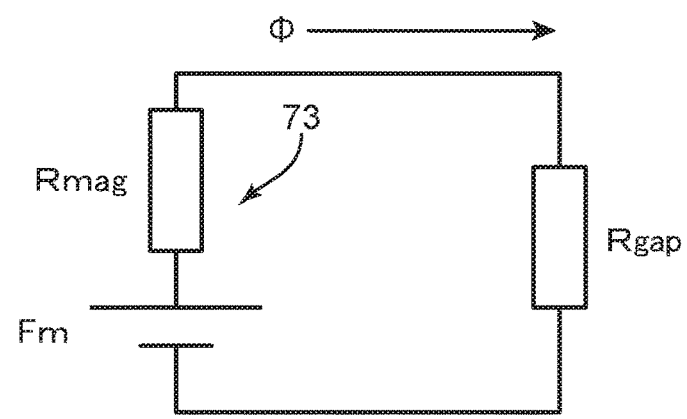
FIG. 12 is a circuit diagram showing the entire magnetic circuit of the linear electric motor according to the comparative example.

In the linear electric motor 70 according to the comparative example, a magnetic circuit 73 as shown in FIG. 12 is formed. In FIG. 12, $\Phi$ denotes magnetic flux, $F_m$ and $R_{mag}$ respectively denote magnetomotive force and magnetic resistance of magnets in the magnetic circuit 73, and $R_{gap}$ denotes magnetic resistance of a clearance.

Figure 13:
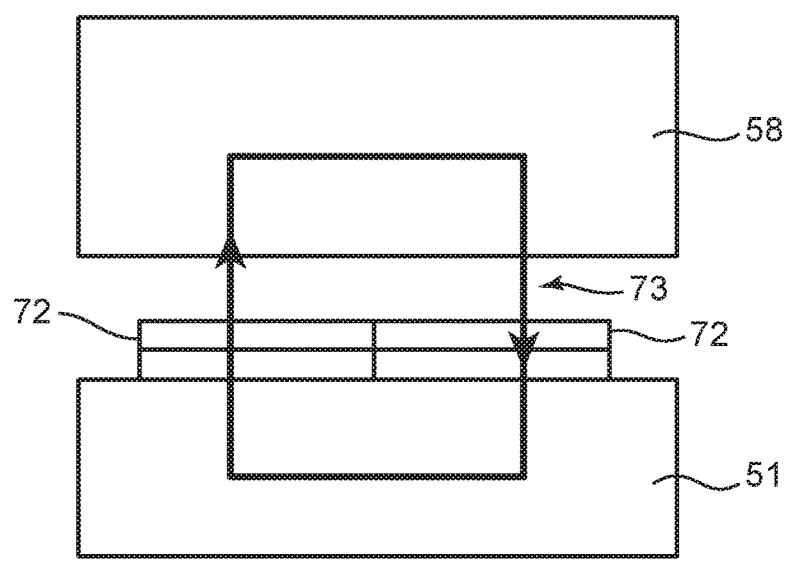
FIG. 13 is a model diagram showing the direction in which magnetic flux flows in the magnetic circuit of the linear electric motor according to the comparative example.

As shown in FIG. 13, the magnetic circuit 73 shown in FIG. 12 is a route in which magnetic flux coming out of a tooth 581 provided in an iron core portion 58 of the stator 50B enters a permanent magnet 72, and returns to a tooth 581 provided in another iron core portion 58 of the stator 50B from a permanent magnet 72 positioned adjacently to the above permanent magnet in the axial direction. The magnetic flux flowing from the permanent magnet 72 on one side to the permanent magnet 72 on the other side passes through the yoke shaft 51. In FIG. 13, two magnets are overlapped in the direction in which the magnetic flux passes through. However, these magnets can be regarded as one magnet at the end.

In the magnetic circuit 73, by the Ampere's circuital law, the following equation is established.

$H_{mag} l + H_{gap} g = 0$ (12)

In the above equation, g denotes clearance length, $H_g$ denotes strength of a magnetic field in the clearance, l denotes thickness of the permanent magnet 72, and H denotes strength of a magnetic field in the permanent magnet 72.

In the magnetic circuit 73, the following equation is also established.

$B_{mag} = \mu 0 H_{mag} + B_r$ (13)

In the above equation, $B_{mag}$ denotes magnetic flux density in the permanent magnet 72, $H_{mag}$ denotes strength of the magnetic field in the permanent magnet 72, and $B_r$ denotes saturation magnetic flux density.

The above equations (12) and (13) will be organized. At this time, if considering that the number of magnetic flux is maintained between the inside of the clearance and the inside of the magnet and a route section is constant, $B_{mag} = B_{gap}$ is established. Thus, the following equation is obtained.

$$B_{gap} = B_r \frac{1}{1 + g/i} \quad (14)$$

When l is 2×3.5 [mm], $B_r$ is 1.33 to 1.25 [T], and g/2 is 1.00±0.04 [mm], from the above equation (14), $B_{gap}$ is equal to 0.95 to 1.01 [T].

That is, in the linear electric motor 50, the magnetic flux density in the clearance is greater than in the linear electric motor 70.

In an electric motor, almost all the magnetic flux in a clearance is inter-linked with the electric current and contributes to interaction. Therefore, with the linear electric motor 50, it is possible to obtain greater thrust force than with the linear electric motor 70.

In the linear electric motor 50, the mover 50A forms the magnetic circuits with the stator 50B. Thus, the magnetic field does not easily leak out to the outside of the water conducting tube 40 (main body tube 41). Therefore, it is possible to suppress an influence of the magnetic field on electric equipment around the water conducting tube 40 (main body tube 41).

Application Example 1 of Embodiment

For example, as shown in FIG. 14, the linear electric motor 50 may include guide mechanisms 80 that regulate rotation of the mover 50A in the circumferential direction with respect to the stator 50B. Each of the guide mechanisms 80 includes a guide groove 82 and a guide projection 84. The guide groove 82 is formed in the stator 50B and extends in the axial direction. In an example shown in FIG. 14, the guide groove 82 is formed between two circumferentially-adjacent coils 59. The guide projection 84 is formed in the mover 50A and positioned in the guide groove 82 so as to regulate the rotation of the mover 50A in the circumferential direction with respect to the stator 50B. In the example shown in FIG. 14, the guide projection 84 is formed in the circumferential magnet 55. The guide projection 84 is arranged in the guide groove 82 movably in the direction in which the guide groove 82 extends.

In such Application Example 1, the rotation of the mover 50A in the circumferential direction with respect to the stator 50B is regulated. Thus, it is possible to stabilize movement of the mover 50A in the axial direction.

Application Example 2 of Embodiment

Figure 15:
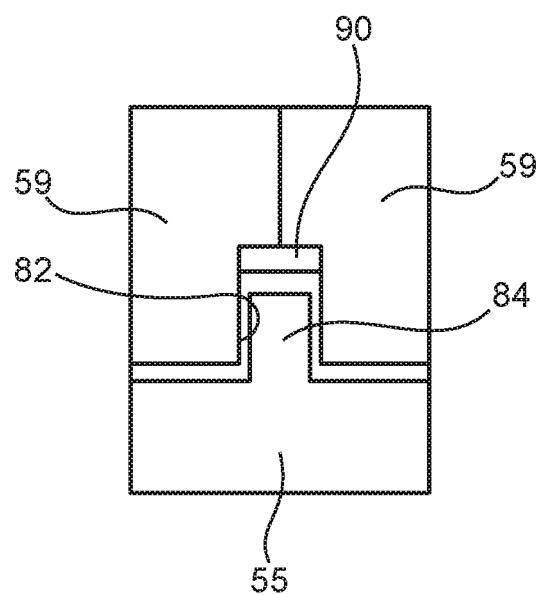
FIG. 15 is a sectional view showing a linear electric motor provided in a launcher according to Application Example 2 of the embodiment of the present invention, the view in which part of the linear electric motor is enlarged.

For example, as a position detection device, a linear encoder may be adopted. In this case, as shown in FIG. 15, by arranging a scale 90 serving as a detected member in the guide groove 82 and reading marks of the scale 90 by a detector arranged in the mover 50A, it is possible to detect the position of the mover 50A.

In this case, the scale 90 is arranged along the guide groove 82. Thus, it is possible to properly detect the position of the mover 50A.

The details of the embodiment of the present invention are described above. However, these are only examples and interpretation of the present invention is not limited at all by the above description of the embodiment.

For example, a guide groove may be formed in a mover and a guide projection may be formed in a stator.

What is claimed is:

1. A launcher that launches an underwater vehicle by water pressure, the launcher comprising:
   a launching tube on which the underwater vehicle is loaded;
   a water conducting tube including a communication portion which communicates with said launching tube, the water conducting tube inside which water is charged; and
   a linear electric motor including a mover movable in said water conducting tube in the direction in which said water conducting tube extends, and a stator that moves said mover by electromagnetic force, the linear electric motor that increases water pressure transmitted to the underwater vehicle in said launching tube through said communication portion by moving said mover toward said communication portion, wherein
   said mover includes:
   a yoke shaft extending in the direction in which said mover is movable;
   a plurality of yoke members respectively arranged in line in the circumferential direction and the axial direction of said yoke shaft so as to enclose said yoke shaft; and
   a plurality of permanent magnets respectively arranged in contact with said plurality of yoke members in such a manner that outside surfaces among surfaces of said plurality of yoke members, the outside surfaces being positioned on the outside in the radial direction of said yoke shaft are exposed as magnetic pole surfaces, the permanent magnets whose regions in contact with said yoke members are magnetized as the same magnetic pole,
   said plurality of permanent magnets includes:
   a pair of circumferential magnets positioned on the both sides of said yoke member in the circumferential direction of said yoke shaft, each of the circumferential magnets being in contact with said yoke member;
   a pair of axial magnets positioned on the both sides of said yoke member in the axial direction of said yoke shaft, each of the axial magnets being in contact with said yoke member; and
   a radial magnet positioned on the inside of said yoke member in the radial direction of said yoke shaft, the radial magnet being in contact with said yoke member,
   said stator includes:
   a plurality of iron core portions respectively arranged in line in the circumferential direction and the axial direction of said yoke shaft so as to enclose said mover, the iron core portions including teeth which are capable of opposing said magnetic pole surfaces respectively provided in said plurality of yoke members in the radial direction of said yoke shaft; and
   a plurality of coils wound around said teeth respectively provided in said plurality of iron core portions,
   with said stator, said mover forms a plurality of magnetic circuits in which magnetic flux generated by said plurality of permanent magnets flows, and
   said plurality of magnetic circuits includes:
   a first magnetic circuit in which the magnetic flux flows through one of said pair of circumferential magnets;
   a second magnetic circuit in which the magnetic flux flows through one of said pair of axial magnets, the second magnetic circuit being formed in parallel to said first magnetic circuit; and
   a third magnetic circuit in which the magnetic flux flows through said radial magnet, the third magnetic circuit being formed in parallel to said first magnetic circuit and said second magnetic circuit, respectively.

2. The launcher according to claim 1, wherein said linear electric motor further includes:
   a guide mechanism that regulates rotation of said mover in the circumferential direction of said yoke shaft with respect to said stator.

3. The launcher according to claim 2, wherein said guide mechanism includes:
   a guide groove formed in one of said mover and said stator, the guide groove extending in the axial direction of said yoke shaft; and
   a guide projection formed in the remaining one of said mover and said stator, the guide projection being positioned in said guide groove so as to be brought into contact with an inner surface of said guide groove when said mover is rotated in the circumferential direction of said yoke shaft with respect to said stator, the guide projection being movable in said guide groove in the direction in which said guide groove extends.

4. The launcher according to claim 1, wherein said linear electric motor further includes:

a position detection device that detects a position of said mover in the direction in which said water conducting tube extends.

5. The launcher according to claim 4, wherein said position detection device includes:
a detector arranged in said mover; and
a detected member formed in said stator and arranged in a groove extending in the axial direction, the detected member extending in the direction in which the groove extends, the detected member to be detected by said detector.

6. The launcher according to claim 1, wherein the water conducting tube further includes:
a housing portion that allows an entry of said mover moved in said water conducting tube in such a manner that the water pressure transmitted to the underwater vehicle in said launching tube through said communication portion is increased, the housing portion having an end on the downstream side in the direction in which said mover enters, the downstream end being closed in such a manner that water charged inside the housing portion is compressed in accordance with the entry of said mover.

7. The launcher according to claim 6, further comprising:
a deceleration stator arranged in said housing portion, the deceleration stator that generates electromagnetic force acting on said plurality of permanent magnets provided in said mover which enters said housing portion, and thereby decelerates said mover.

8. The launcher according to claim 2, wherein said linear electric motor further includes:
a position detection device that detects a position of said mover in the direction in which said water conducting tube extends.

9. The launcher according to claim 3, wherein said linear electric motor further includes:
a position detection device that detects a position of said mover in the direction in which said water conducting tube extends.

* * * * *